United States Patent [19]

Gualtieri et al.

[11] Patent Number: 4,713,577
[45] Date of Patent: Dec. 15, 1987

[54] MULTI-LAYER FACETED LUMINESCENT SCREENS

[75] Inventors: Devlin M. Gualtieri, Ledgewood; Shui T. Lai, Florham Park, both of N.J.

[73] Assignee: Allied Corporation, Morris Township, N.J.

[21] Appl. No.: 811,184

[22] Filed: Dec. 20, 1985

[51] Int. Cl.[4] .................. H01J 29/20; C09K 11/08
[52] U.S. Cl. ................................ 313/468; 313/474; 428/690; 252/301.4 R
[58] Field of Search ............... 313/461, 463, 468, 474; 252/301.4 R; 427/64; 428/690

[56] References Cited

U.S. PATENT DOCUMENTS 4,298,820 11/1981 Bongers et al. ............... 313/463
4,550,256 10/1985 Berkstresser et al. ........ 250/486.1 X

FOREIGN PATENT DOCUMENTS 79200011.9  9/1979  European Pat. Off. .
0166924     5/1985  European Pat. Off. .
2000173A    6/1978  United Kingdom .

OTHER PUBLICATIONS

D. M. Gualtieri et al., J. Appl. Phys. 57, 3879 (1985).
J. M. Robertson et al., Thin Sol. Films 114, 221 (1984).

Primary Examiner—Leo H. Boudreau
Assistant Examiner—Sandra L. O'Shea
Attorney, Agent, or Firm—Anibal Jose Cortina; Gerhard H. Fuchs

[57] ABSTRACT

A multi-layer luminescent screen includes a luminescent crystalline sublayer and a faceted overlayer. The faceted overlayer causes the emission from the screen of a greater fraction of the luminescence than would otherwise be the case. The screens, which are typically cathodoluminescent, find application in computer displays, lithography, and flying spot scanners.

20 Claims, 4 Drawing Figures

MULTI-LAYER FACETED LUMINESCENT SCREENS

BACKGROUND OF THE INVENTION

1. Field of the Invention

This invention relates to luminescent screens of at least two crystalline layers; more particularly, screens in which a mismatch in lattice constant of a sublayer and overlayer provide enchanced luminescent output.

2. Description of the Prior Art

The use of rare-earth phosphor materials in cathodoluminescent screens for cathode ray tube applications is well known. One disadvantage of the conventional, powder phosphor layer in cathode ray tubes is its degradation due to heating effects from the energy absorbed from the electron beam. A second disadvantage is that the screen resolution is limited by the size of the phosphor particles and the non-uniformity of the deposited phosphor layer.

Single crystal phosphor layers on suitable substrates solve both these problems. The intimate contact between an epitaxial phosphor layer and its substrate facilitates heat transfer out of the phosphor layer. Since the phosphor is a single crystal, there is no particle-size-limiting resolution. (Such epitaxial single crystal crystal phosphor layers have been reviewed in J. M. Robertson et al, Thin Sol. Films 114, 79221) (1984). (See also U.K. patent application GB2000173A and European patent application No. 79200011.9.) A disadvantage of single crystal phosphor layers is that much of the light that is generated in the cathodoluminescent phosphor is "piped" to the edges of the phosphor layer/substrate composite. This waveguide action reduces the useful light output at angles close to normal viewing incidence.

One method for increasing the intensity of light at normal incidence, disclosed in U.S. Pat. No. 4,298,820, issued on Nov. 3, 1981, to Bongers et al, is to etch grooves into the phosphor layer to allow the escape of light. A disadvantage of this technique is that the resolution of the phosphor layer is limited by the dimensions of the grooves. Another disadvantage is the extra processing required to form the grooves; some cathodoluminescent materials, such as yttrium aluminum garnet (YAG), are highly resistant to chemical and mechanical milling.

Certain epitaxial growth conditions on garnet result in a type of defect known as faceting. The conditions for such facet growth in a type of magneto-optical garnet were disclosed by D. M. Gualtieri at the 30th annual Conference on Magnetism and Magnetic Materials, San Diego, November 1984 (D. M. Gualtieri and P. F. Tumelty, to be published in J. Appl. Phys.). J. M. Robertson et al. (op. cit., p.227) reported such a facet defect in garnet phosphor layers and observed that facets scatter cathodoluminescence to forward directions. They also disclosed that such a defect reduced the resolution, because of multiple internal reflections, and concluded that facets should be avoided in the preparation of such layers.

SUMMARY OF THE INVENTION

In accordance with the present invention, a luminescent screen is provided, having at least two layers. The screen comprises a luminescent crystalline sublayer that has a surface on which is a crystalline overlayer that has (a) the same crystal structure as the sublayer and (b) a lattice constant that sufficiently exceeds the lattice constant of the sublayer that the overlayer is faceted.

The screen of the present invention provides a unique combination of high image quality and high efficiency.

DETAILED DESCRIPTION OF THE INVENTION

The luminescent screens of the present invention are intended for use in cathode ray tubes, electron microscopes, x-ray image intensifiers, and other applications where light output is generated from particle beam or high-energy electromagnetic radiation input.

Prior art luminescent screens are generally of two types —"powder" and "crystalline layer." A powder screen comprises phosphor particles that are dispersed in a binder and coated onto a substrate. A crystalline layer screen has a crystalline phosphor layer in place of the particles and binder. Both types of screen were described by Robertson et al., and our FIGS. 1 and 2 are based on their FIGS. 2a and 2b.

Figure 1:
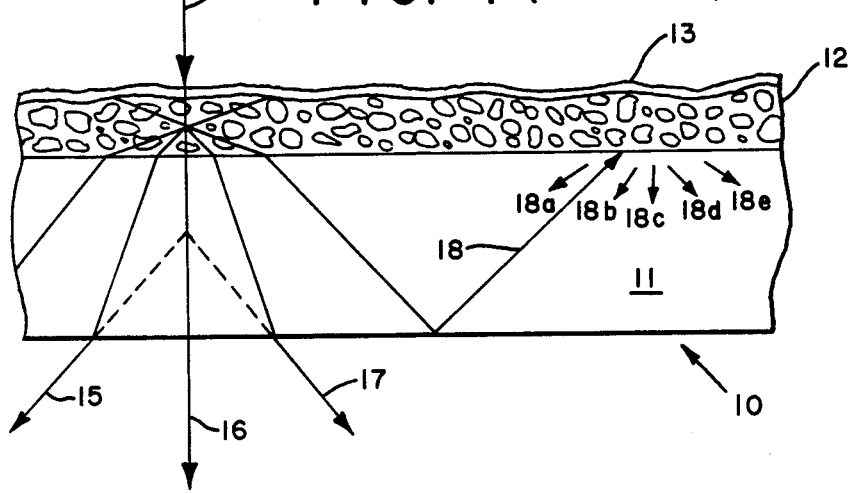
FIG. 1 depicts a prior art powder luminescent screen.

FIG. 1 shows powder screen 10, which includes a substrate 11 supporting the powder layer 12, on which is an optional reflective backing layer 13. An incident electron beam 14 generates light in the phosphor particles. The light may be emitted through the transparent substrate, as depicted by rays 15, 16, and 17, or it may be totally internally reflected (ray 18). Any light ray incident on phosphor particles may be scattered. Diffuse scattering by the phosphor particles, as depicted by rays 18a . . . 18e, creates an undesirable "halo" effect.

Figure 2:
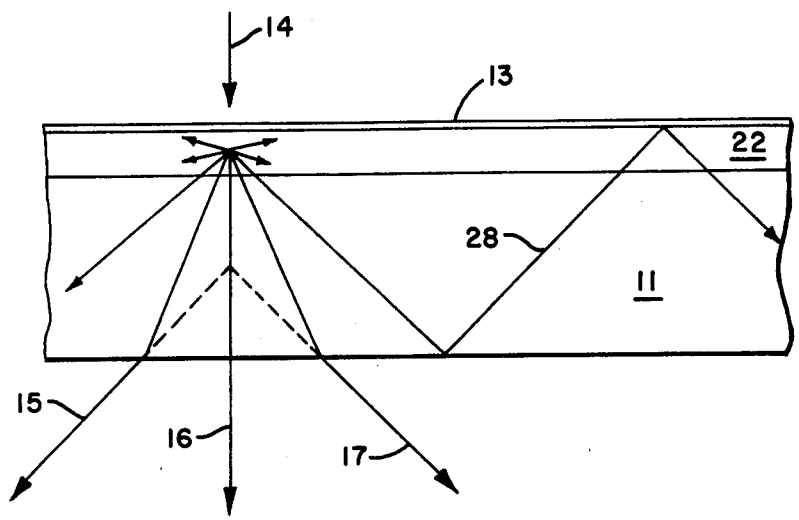
FIG. 2 depicts a prior art crystalline layer luminescent screen.

Better image quality, due to reduced scattering, is achieved by a crystalline layer screen of the type shown in FIG. 2, where crystalline layer 22 replaces powder layer 12. A crystalline layer, preferably a single crystal, also has desirably higher thermal conductivity than does powder. Likewise, for the best image quality, layer 22 is a single crystal, with a minimal number of defects or dislocations, which can scatter the light. However, multiple internal reflections, exemplified by ray 28, cause a reduction in light emitted from the front of the substrate, compared with the output from powder screens.

A goal of the present invention is to combine the high light output of the powder screen with the good image quality of the layer screen. A means for accomplishing the goal is a two-layer screen structure. Each of the layers ("sublayer" and "overlayer") is crystalline; the sublayer is luminescent and the overlayer may be luminescent as well. The distinctive features are that the two layers have the same crystal structure and that the lattice constant of the overlayer exceeds that of the sublayer sufficiently that the overlayer is "faceted." Some background information should help to explain faceting.

Crystals tend to assume certain gross shapes in bulk form. The crystals exhibit certain faces, or "facets," which are a consequence of atomic symmetry. As an example, sodium chloride, common table salt, is found as crystalline cubes because of its cubic structure. The sublayer and overlayer of the present invention are preferably garnets. Garnet is crystallographically cubic, but it has a more complex space group than sodium chloride, and its crystals have many more facets. For convenience we limit the discussion to garnets, but there should be no inference that the invention is limited to garnets.

Although other growth processes may be suitable, the overlayers of this invention are generally grown by liquid phase epitaxy (LPE), described in Blank et al., J. Cryst. Growth 17, 302 (1972). The optimum situation of epitaxial growth is "homoepitaxy," where the substrate and overgrowth are of the same material. The present invention involves heteroepitaxy onto a sublayer of a different (garnet) overlayer. Such heteroepitaxy generally causes the overgrowth to be strained, due to lattice constant mismatch. When strained layers are grown, the strain, increasing with layer thickness, can exceed the elastic limits of the material. In this case, dislocations are formed, and the material is in the "plastic" region of a stress-strain curve. The effect of epitaxial growth in the "plastic" region is the generation of facets on a local scale, but, initially, not over the total dimension of the crystal. The dislocations that separate the facet regions give stress relief to the epitaxial overgrowth. Ultimately, as thickness increases, facets cover the entire area.

In the conventional view, "the most important requirement for successful garnet epitaxy has been the need for lattice parameter match. This has been the best single predictor for success." (L. Varnerin, IEEE Trans. on Magn. MAG-7, 404 (1971)) Faceting of an LPE layer has been considered a defect, and identification of parameters to suppress faceting "a major achievement," (ibid.) A key element of facet suppression is good lattice match (to within 1 to 2 ppm).

The present invention departs from the conventional view. Under controlled conditions, the crystal morphology of a LPE garnet film changes (as growth parameters change) from a continuous, low-defect film (for small lattice mismatch) to a highly defective facet structure (for large mismatch). However, if lattice mismatch is too great, epitaxial growth is prevented. Thus, the LPE overlayer lattice constant preferably exceeds that of the sublayer by less than about 2%.

Figure 3:
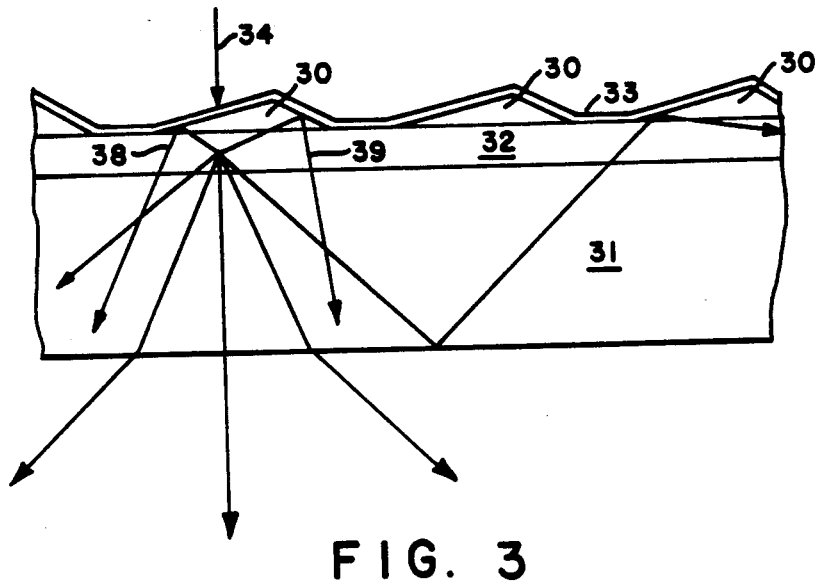
FIG. 3 depicts a luminescent screen of the present invention.

FIG. 3 depicts an embodiment of the present invention. The screen depicted there includes a faceted overlayer 30, in addition to optional substrate 31, which supports the luminescent sublayer 32. Also shown is optional reflective backing layer 33. Rays like 38 and 39, which would be totally internally reflected if they were generated in the prior art "layer" screen depicted in FIG. 2, are emitted from the front of substrate 31. At the same time, the sublayer, which is preferably a single crystal, provides minimal image-degrading scattering sites. Luminescent materials suitable for sublayer 32 are known in the art and generally comprise a doped crystal. Preferred host crystals are garnets, such as YAG or gadolinium gallium garnet (GGG), and preferred dopants are luminescent ions of one or more rare earths or transition metals. More-preferred dopants are ions of Ce, Tb, or Eu, with Ce most preferred. Dopant levels for luminescent layers of this invention are generally limited by the compatibility of dopant and host and/or by quenching. High dopant level is desirable, because it provides high saturation intensities. Typical dopant levels are in the range between about 0.1 and 5 atomic %.

When the sublayer is YAG or GGG, the surface onto which the overlayer is deposited is preferably the (111) face. Sublayer thickness is not critical. For efficient operation, the sublayer should be thick enough to absorb a substantial fraction of the incident beam 34, but not so thick that it absorbs too much of the light that must pass through it. Depending on the nature of the incident beam and the sublayer material, thicknesses between one micrometer and one millimeter are suitable. The thinner sublayers generally require a support substrate, while the thicker ones may be self-supporting.

When a support is required or desired, its material should be transparent to the light emitted and be suitable for the sublayer to be deposited onto it. It should also have good thermal conductivity to minimize the temperature at which the screen operates. High temperatures can damage the screen. If the sublayer is a host crystal that includes a luminescent ion, the undoped host crystal may be a suitable support material.

The overlayer material must have the same crystal structure as the sublayer but a larger lattice constant. The lattice constant mismatch required for facets to develop depends on the elastic modulus and shear modulus of the overlayer. For YAG, GGG and similar garnets, facets develop if the overlayer lattice constant exceeds that of the sublayer by at least about 0.5%. If the sublayer is YAG, a suitable overlayer is $Y_3Al_{5-a}(Sc,In)_aO_{12}$ (YSAG), where a is between 0 and about 2. If the sublayer is GGG, a suitable overlayer is $Gd_3Ga_{5-b}(Sc,In)_bO_{12}$ (GSAG), where b is between 0 and about 2. In the embodiment shown in FIG. 3, the overlayer thickness should be large enough to scatter light out of the sublayer (with facets covering the entire area), but small enough to be substantially transparent to the incident beam 34. Preferably, overlayer thickness is less than about one micrometer if it is not luminescent.

Reflective backing layer 33, if present, serves two purposes. It reflects out of the screen light that might otherwise escape. In addition, it facilitates making an electrical connection to the screen. Typically, the screen is an anode in a cathode ray imaging system and the metal backing is grounded through the cathode. High reflectivity and low resistance are desirable and readily provided by conventional coatings of aluminum or silver.

Figure 4:
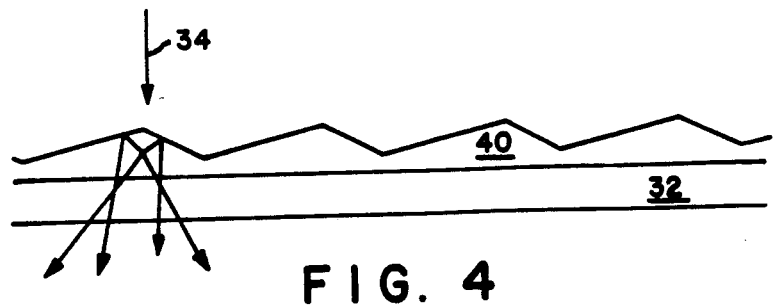
FIG. 4 depicts an embodiment of a luminescent screen of the present invention that has a luminescent overlayer.

FIG. 4 depicts an embodiment in which the overlayer 40 is also luminescent. An advantage of that embodiment is that the screen can then be used with both low-energy electrons, which are absorbed in a thin layer, and high-energy electrons, which penetrate into the sublayer. When the overlayer composition is luminescent, it includes a suitable dopant in the overlayer crystal. Generally, if the overlayer is GSAG or YSAG, the dopant is a transition metal or rare earth ion, preferably, Ce, Tb, or Eu, with Ce most preferred. It may be convenient to use the same dopant in sublayer and overlayer, but it is not necessary. When the overlayer is luminescent, it should be thick enough to absorb a substantial fraction of incident beam 34.

Note that FIGS. 3 and 4 depict the electron beam incident on one surface of the screen and the light emitted from the opposite surface. In practice, the beam may be incident on the same surface that the light is emitted from; the criteria are that the incident electron beam penetrate to the luminescent layer and the output light not be appreciably absorbed before it emerges from the screen.

We claim:

1. A luminescent screen having at least two layers and comprising a luminescent crystalline sublayer that has a surface on which is a crystalline overlayer that has:
   (a) the same crystal structure as the sublayer, with the sublayer being a single crystal; and
   (b) a lattice constant that sufficiently exceeds the lattice constant of the sublayer that the overlayer is faceted; and
   (c) said sublayer comprising $Gd_3Ga_5O_{12}:M$ and said overlayer comprising $Gd_3Ga_{5-b}(Sc, In)_bO_{12}$ where b is in the range between 0 and about 2 and where M is at least one luminescent ion.

2. The screen of claim 1 in which M is one or more ion of an element selected from the group consisting of Ce, Tb, and Eu.

3. The screen of claim 2 in which M includes Ce ion.

4. The screen of claim 1 in which the orientation of the sublayer surface is (111).

5. The screen of claim 1 in which the lattice constant of the overlayer exceeds that of the sublayer by less than about 2%.

6. The screen of claim 1 in which the overlayer is less than one micrometer thick.

7. The screen of claim 1 in which the overlayer is luminescent.

8. The screen of claim 1 further comprising a support for the sublayer.

9. The screen of claim 8 in which the support comprises an undoped crystal and the sublayer comprises the same crystal and a dopant.

10. The screen of claim 1 further comprising a reflective coating on the faceted layer.

11. A luminescent screen having at least two layers and comprising a luminescent crystalline sublayer that has a surface on which is a crystalline overlayer that has:
    (a) the same crystal structure as the sublayer, with the sublayer being a single crystal; and
    (b) a lattice constant that sufficiently exceeds the lattice constant of the sublayer that the overlayer is faceted; and
    (c) said sublayer comprising $Gd_3Ga_5O_{12}:M$ and the overlayer comprising $Gd_3G_{5-b}(Sc,In)_bO_{12}:M''$ in which M and M'' are each at least one luminescent ion, and b is in the range between 0 and about 2.

12. The screen of claim 11 in which M is one or more ions of an element selected from the group consisting of Ce, Tb, and Eu.

13. The screen of claim 12 in which M includes Ce ion.

14. The screen of claim 11 in which the orientation of the sublayer surface is (111).

15. The screen of claim 11 in which the lattice constant of the overlayer exceeds that of the sublayer by less than about 2%.

16. The screen of claim 11 in which the overlayer is less than one micrometer thick.

17. The screen of claim 11 in which the overlayer is luminescent.

18. The screen of claim 11 further comprising a support for the sublayer.

19. The screen of claim 18 in which the support comprises an undoped crystal and the sublayer comprises the same crystal and a dopant.

20. The screen of claim 11 further comprising a reflective coating on the faceted layer.

* * * * *